United States Patent
Leichliter, III

(10) Patent No.: US 8,703,079 B2
(45) Date of Patent: Apr. 22, 2014

(54) METHOD FOR TREATING LIME MUD

(75) Inventor: John Mahlon Leichliter, III, Roswell, GA (US)

(73) Assignee: Andritz Oy, Helsinki (FI)

(*) Notice: Subject to any disclaimer, the term of this patent is extended or adjusted under 35 U.S.C. 154(b) by 1138 days.

(21) Appl. No.: 12/631,889

(22) Filed: Dec. 7, 2009

(65) Prior Publication Data

US 2010/0086476 A1 Apr. 8, 2010

Related U.S. Application Data

(62) Division of application No. 11/282,690, filed on Nov. 21, 2005, now Pat. No. 7,628,964.

(51) Int. Cl.
*C01F 1/00* (2006.01)

(52) U.S. Cl.
USPC .......... 423/173; 432/14; 432/17; 432/103; 432/106; 162/30.11; 162/58; 162/182

(58) Field of Classification Search
USPC .......... 432/103, 14, 106, 17, 32; 423/173; 162/30.11, 58, 189; 34/370, 368
See application file for complete search history.

(56) References Cited

U.S. PATENT DOCUMENTS

| | | | |
|---|---|---|---|
| 3,603,569 A * | 9/1971 | Abboud et al. | 432/16 |
| 4,391,671 A | 7/1983 | Azarniouch | |
| 5,110,567 A | 5/1992 | Mattelmäki | |
| 5,213,496 A * | 5/1993 | Ahvenainen | 432/103 |
| 5,413,635 A * | 5/1995 | Matweecha et al. | 106/792 |
| 5,711,802 A | 1/1998 | Theil | |
| 5,989,018 A * | 11/1999 | Ahvenainen | 432/109 |
| 6,719,879 B2 * | 4/2004 | Olsen et al. | 162/29 |
| 2009/0047613 A1 * | 2/2009 | Demler et al. | 432/17 |

FOREIGN PATENT DOCUMENTS

| | | |
|---|---|---|
| DE | 43 08 549 | 9/1994 |
| EP | 0 751 916 B1 | 1/1997 |
| FI | 106642 B | 3/2001 |
| FI | 108235 B | 12/2001 |

OTHER PUBLICATIONS

International Search Report mailed Jun. 22, 2007.

* cited by examiner

*Primary Examiner* — Nina Bhat
(74) *Attorney, Agent, or Firm* — Nixon & Vanderhye P.C.

(57) ABSTRACT

A method for feeding lime mud into a lime kiln including a rotary kiln shell having an interior between a first end wall and a second end wall, the method including: feeding the lime mud into a flue gas flow in the interior of the rotary kiln shell or in close proximity to the shell to pretreat the lime mud; separating the pretreated lime mud from the flue gas flow; conveying the separated lime mud into the lime kiln, and calcining the separated lime mud in the lime kiln.

8 Claims, 3 Drawing Sheets

METHOD FOR TREATING LIME MUD

CROSS RELATED APPLICATION

This application is a divisional application of U.S. patent application Ser. No. 11/282,690 (now U.S. Pat. No. 7,628,964) filed Nov. 21, 2005, the entirety of which is incorporated by reference.

BACKGROUND OF THE INVENTION

The invention relates to a method and apparatus for treating lime mud, and a particular configuration of a rotary lime kiln at a pulp mill. A lime kiln is part of the pulp mill chemical recovery plant, the lime being used for causticizing green liquor to produce white liquor in the production of kraft pulp.

Lime mud is produced in the causticizing plant of a sulphate pulp mill. For reuse the lime mud which is mainly calcium carbonate ($CaCO_3$) is regenerated by reburning it to form calcium oxide (CaO). The reburning takes place in an ordinary rotary kiln, into the upper end of which the lime mud is supplied. The mud flows slowly downwardly through drying, heating and reaction zones. Conventional rotary kilns desirably enhance the heat transfer from the flue gases and the lime mud in the drying zone by providing chains and/or lifters, which rotate with the kiln and come into contact with the lime mud during that rotation. In order to obtain proper results the heat treatment of lime mud typically takes place slowly in the kiln, meaning that the kiln must be long and therefore takes up significant floor space or land area.

One prior art method to allow a shorter kiln is a suspension-type drying system. In such systems lime mud is introduced into a vertical conduit through which the flue gas from the kiln moves upwardly at a relatively high rate of speed. Most of the lime mud is entrained in the upwardly moving gas, and dried by contact therewith, and the flue gas with entrained particles is fed to a conventional separator (such as a cyclonic separator), the flue gas being discharged and the lime mud particles—which now have been dried—being fed to the inlet to the lime kiln. U.S. Pat. No. 5,110,567 discloses thickening of lime mud in a lime filter to a dryness of over 75%, whereby it is possible to introduce the lime mud directly into a suspension dryer without the necessity of using hammer mills or mixing screws for crushing lumps of lime mud. The lime mud is so dry that the dryer will remain open. Another point of feeding lime mud is, however, still needed for the lime reburning kiln. When the "precoat" of the lime mud filter is replaced, it is not desirable to feed the moist lump of lime mud into the suspension dryer because there is a risk of the dryer becoming clogged, but the lime mud lump is introduced directly into the lime reburning kiln by means of a separate feed screw.

U.S. Pat. No. 5,413,635 discloses a method, in which a controllable amount of flue gas that has exited a flash dryer and has been separated from the dried lime mud is recycled back into the vertical portion of the flash dryer below the feed inlet portion of the flash dryer. The aim is that the velocity of the gas through the flash dryer is maintained at a level sufficient to entrain all of the lime mud feed in the gas stream. In a process malfunction, where the gas velocity is sufficient, the moist mud falls down. This may cause plugging.

U.S. Pat. No. 5,213,496 discloses a method for feeding lime mud to a lime kiln according to which method all the moist lime mud from a lime mud filter is supplied to the upper end of a feed chamber of the kiln. Lime mud may be transported from this chamber either to a suspension dryer or directly to a kiln or both, depending on the dry solids content and particle size of the lime mud. There is a partition wall in the upper portion of the feed chamber dividing the chamber into two flow channels. The amount of lime mud entering the dryer may be regulated by changing, by means of a control baffle disposed in the upper section of the partition wall, the relationship between the gas flow volumes flowing through the adjacent flow channels. In the lower end of the flue gas chamber, there is a spiral feeder, which transports the moist lime mud falling into the lower end to the kiln. Dried lime mud from the separation apparatus is brought via a return duct to the vicinity of this spiral feeder. Such systems—namely combinations of suspension-type dryers and rotary kilns—are replacing rotary kilns per se in the marketplace because the combination of a suspension-type dryer and rotary kiln provides high heat capacity and good heat economy. Capacity and heat economy of such a combination may be further improved by employing two subsequent suspension drying stages, one of which serves as a dryer per se, the other acting as a preheater. The flue gases from a kiln are first taken to a suspension preheater and from there to the dryer. The lime mud to be dried is supplied from a lime mud filter to the dryer, then to the preheater, and finally to the kiln to be calcinated therein.

In U.S. Pat. No. 5,711,802 (European patent No. 751916) it is stated that a disadvantage of the plant having the above-described drying and preheating stages is that the temperature of the preheating stage may become so high that lime mud tends to stick onto metal surfaces. It is further stated that dry sticking problems occur typically at temperatures in the range of 400-600° C., depending on the dry solids content of the lime mud. In U.S. Pat. No. 5,711,802, the sticking of lime mud is prevented so that the temperature of the preheating stage does not exceed a temperature between 400-600° C. The temperature is regulated either by feeding part of the moist lime mud directly into the preheating stage or by directing part of the flue gas from the lime kiln directly into lime mud drying, thus bypassing the lime mud preheating stage. However, both regulation methods are complicated to accomplish in practice. The disadvantage of the first-mentioned method is the feeding of moist lime mud into two separate locations positioned far from each other. This results in both a complicated transporting and feeding apparatus and increasing maintenance load. In the latter regulation method, the problem consists in the large amount of flue gas transportation piping and the fact that maintaining an adequate flue gas flow in the piping may in extreme situations (i.e. very moist or very dry lime mud) require special arrangements.

When feeding dried and/or preheated lime mud into the kiln, metallic constructions of the feed end of the kiln are exposed to severe stress in the gas exit temperatures. The strength of metals begins to decrease at high temperatures, even though their heat resistance otherwise would stay at a reasonable level. Further, at these temperatures lime mud tends to stick onto surfaces. FI patent No. 106642 discloses a method, according to which part of the thickened moist lime mud is dried and preheated by means of flue gas from the lime kiln, separated from the flue gas and fed into the feed end of the lime kiln. For cooling the constructions of the feed end of the kiln, part of the moist lime mud is fed directly into the feed chamber of the lime kiln, bypassing the flue gas treatment, in order to cool the feed end constructions.

FI patent No. 108235 discloses a method, according to which moist lime mud is dried by means of flue gas originating from lime mud calcination and separated from the flue gas, and the dried lime mud is preheated by means of flue gas originating from lime mud calcination, separated from the flue gas and fed into a calcination apparatus. The temperature of the preheating is regulated into a certain value in the range of 400-600° C. by circulating part of the preheated lime mud into the lime mud drying stage.

Even though it may be stated based on the above that several solutions have been presented for regulating the temperature in lime mud treatment with flue gases and at the feed end of the lime kiln, there still exists a need to find a simpler method for controlling the temperature in connection with lime mud feeding, so that e.g. lime mud sticking can be decreased or eliminated. Further, the known kilns include a feed chamber/smoke chamber connected to the kiln shell which makes the kiln longer.

BRIEF DESCRIPTION OF THE INVENTION

With existing lime kilns having a suspension dryer, the temperature of the flue gas leaving the rotary lime kiln exceeds approximately 700° C., and at a temperature somewhere around 700 C, the lime mud sticking begins to disturb the normal operation of the process, because lime mud material builds up on hot surfaces. Lime mud which is not entrained in the flue gas falls down and requires additional equipment to transport it into the rotary kiln. Therefore, the capacity of the rotary kiln is limited by the maximum flue gas exit temperature due to build-up problems described above.

To avoid the above problems associated with the prior art systems lime mud may be introduced into the flue gas stream of a lime kiln in such a way, which cools the gas stream. This provides for a method by means of which the conditions prevailing at the feed end of the lime kiln are such that sticking of lime mud onto hot surfaces and the wearing of those surfaces can be efficiently prevented. A further advantage of the treatment is to simplify the construction of the lime kiln.

A method has been developed for feeding lime mud into a lime kiln comprising a rotary kiln shell having a first and a second end wall, wherebetween an interior of the kiln is formed, according to which method the lime mud is pretreated by means of flue gases from the lime kiln by feeding the lime mud into a flue gas flow, the pretreated lime mud is separated from the flue gas, conveyed into the lime kiln and calcined therein. The lime mud to be pretreated is fed into the flue gas flow in the interior of the rotary kiln shell or in close proximity of the shell.

An apparatus for treating lime mud has been developed, comprising:

a rotatable kiln comprising a shell having a first shell end into which lime mud is introduced, and from which flue gases from calcining lime mud within a calcination space of the kiln are discharged, and a second shell end from which calcined lime mud is discharged;

a first separator device for separating pretreated lime mud from flue gases;

a riser duct for simultaneously conveying flue gas from the kiln and lime mud introduced into the flue gas to the separator, said duct having a first duct end connected via a kiln exit gas duct to the kiln and a second duct end connected to the separator;

feeding means for dosing lime mud into the riser duct; and conveying means for conveying pretreated lime mud to the kiln for calcining therein. A feature of the apparatus is that the feeding means is arranged so that lime mud to be pretreated is introduced into the riser duct at a point located inside the kiln shell or in close proximity of the shell.

A "riser duct" is the duct or conduit which conveys the flue gas and lime mud from the point at which the lime mud is introduced into the flue gas to the entrance of the separation device. The lime mud is dried and heated by the heat of the flue gas in the mud riser duct. "Kiln exit gas duct" is a duct or conduit which is connected to the lower end of the riser duct and which directs the flue gas flow from the kiln interior to the riser duct. Depending on the location of the point where lime mud is introduced into the flue gas the kiln exit gas duct is located partially or wholly inside the kiln shell. The term "close proximity" can, in one embodiment, mean a distance of half (0.5) of the diameter of the kiln shell or less from the center of the first end of the kiln shell to the point at which the lime mud enters the riser duct outside the kiln shell. The feeding means or feeder for introducing lime mud into the flue gas in the riser duct is typically a feed screw or like, but it can be also a pipe, a combination thereof or other lime mud feeding device. The conveying means or conveyor for leading pretreated lime mud to the kiln is typically a pipe, but it can also be a drag-chain conveyor, other conveying devices or combinations thereof.

Moist lime mud is introduced into the flue gas stream of a lime mud kiln in such a way, which cools the gas stream and eliminates or at least decreases plugging of the feed end of the kiln and the ducts of the suspension dryer. Kilns having a suspension dryer plug in the feed end of the kiln if the gas temperature gets above about 700° C. and the lime mud gets sticky enough to start coating the walls, spirals, etc. This makes the sticking temperature an operational limit if there is no means to cool the gas quickly. A way to lower the temperature is to use the cold lime mud to drop the gas temperature quickly before it can stick to anything. The new design mixes the lime mud and the flue gas at the end of the riser duct as the gas exits the kiln. The location is actually inside the kiln shell or in close proximity of the shell. Known designs introduce the lime mud into the gas stream well downstream from the feed end housing of the kiln which makes them vulnerable to plugging.

Cooling of flue gases of a lime kiln enables the kiln to operate at a significantly higher back-end or exit gas temperature without plugging. This further allows higher production rate for any given kiln size. The limit of approximately 700° C. on kiln feed end temperature becomes the design point used for sizing lime kilns having a suspension dryer. With this design, there should be no limit or at least it will be significantly higher. This will allow reducing the kiln size for a given capacity. A separate feed chamber/flue gas chamber is not needed any more. Thus the lime kiln of the present invention is devoid of a smoke chamber or feed end housing.

In the design of the feed system, the introduction of lime mud into the flue gas stream can be controlled in such a way that lime mud is either entrained into the flue gas stream or a portion of the lime mud falls directly into the interior of the kiln. In the latter case moist lime mud does not drop, like in known kiln systems, into a feed end housing of the kiln, where plugging could occur before the lime mud either falls further or is transported into the kiln. Here the cause of plugging is the dropping of mud from the feed screw into the housing. This is particularly a problem if the gas velocity in the drying pipe of the suspension drier is low or the mud is very moist. If these conditions should occur with the present design, all of the mud will fall directly to the interior of the kiln and no plugging will occur. In the present design there is no equipment required between the lime mud feed point and the point at which the flue gas enters the riser duct so that, in particular, smoke chambers, feed end housings and other equipment on which lime mud can build up have been eliminated. Lime mud which is not entrained may fall directly into the lime kiln without the need for additional equipment to transport the lime mud. Lime mud can be bypassed before it is fed to the flue gas stream and can fall directly into the lime kiln without the need for additional equipment to transport the lime mud.

With existing lime kilns having a suspension dryer, the lime mud filter is located typically one floor level higher than the feed end of the lime kiln, because the lime mud has to be introduced into the kiln flue gas in the riser duct above the smoke chamber or feed end chamber. The design eliminates this limitation, because the lime mud to be pretreated can be introduced into the flue gas even inside the kiln. Thus the lime mud filter can be standing on the same floor level as the feed end of the lime kiln. This allows considerable space savings in vertical direction.

Preferably moist lime mud from a lime mud filter is introduced into the flue gas stream in the riser duct. According to another embodiment of the design, the kiln has two subsequent suspension drying stages, one of which serves as a dryer per se, the other acting as a preheater. The flue gases from the kiln are first taken to a suspension preheater and from there to the dryer. The lime mud to be dried is supplied from a lime mud filter to the dryer, then to the preheater. According to this embodiment the pretreatment comprises two stages so that in a first stage moist lime mud thickened in a lime mud filter is dried by means of flue gas from the kiln and separated from the flue gas, and in a second stage dried lime mud from the first stage is preheated also by means of flue gas from the kiln, separated from the flue gas, whereby in the second stage dried lime mud is introduced into the flue gas flow in the interior of the rotary kiln shell or in close proximity of the shell.

BRIEF DESCRIPTION OF THE DRAWINGS

The invention is described more in detail below with reference to the accompanying drawings of which.

DETAILED DESCRIPTION OF THE INVENTION

Figure 1:
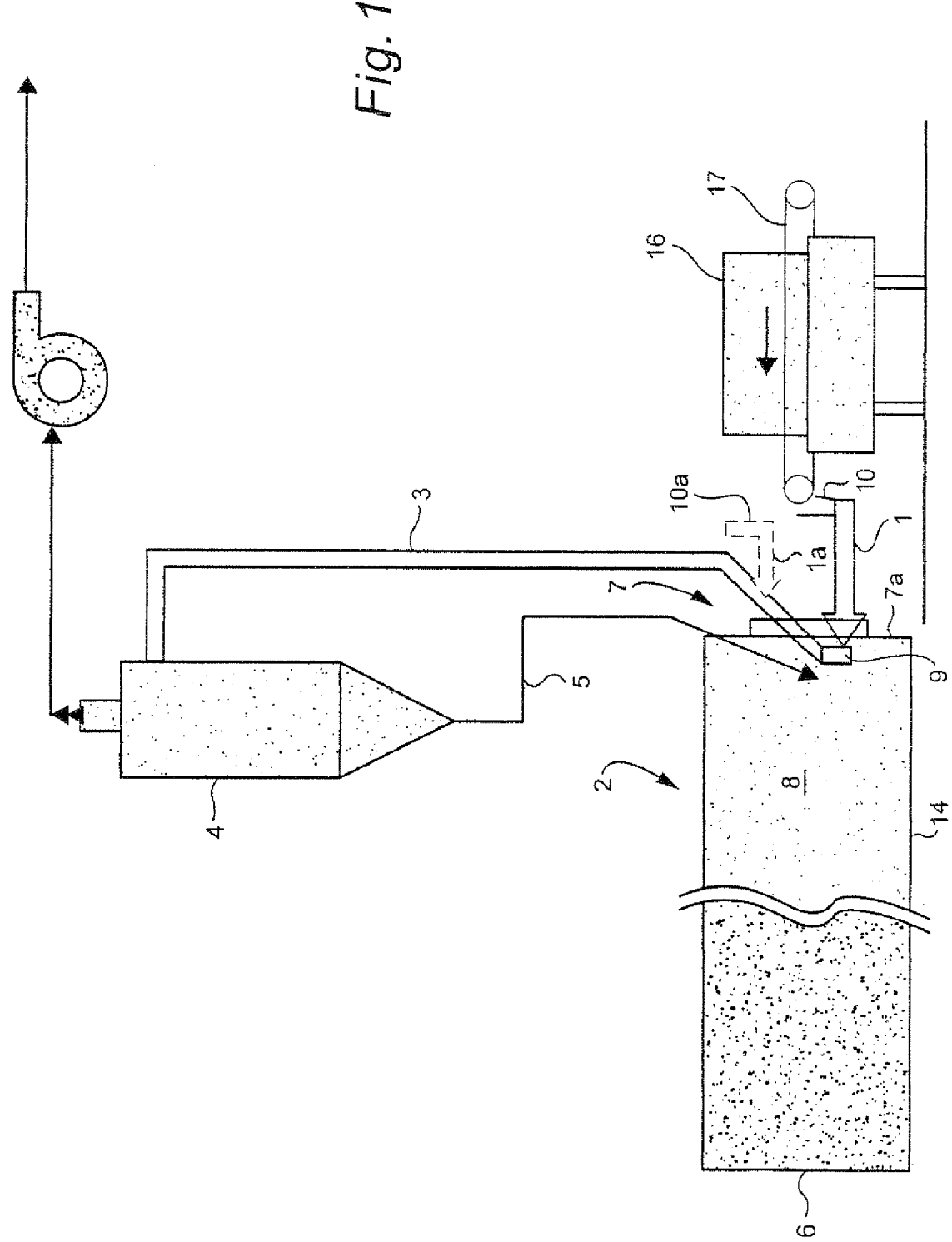
FIG. 1 is a schematic principle illustration of an exemplary apparatus according to the present invention.

The main parts of the apparatus shown in FIG. 1 comprise a feed screw 1, a lime kiln 2 and a riser duct 3 in connection thereto and a dryer separation cyclone 4. The lime kiln comprises an elongated kiln shell having a feed end wall 7 and a discharge end wall 6. The interior 8 of the kiln is located between the end walls.

The kiln is devoid of a separate feed chamber/flue gas chamber in connection with the kiln, but the lower part 9 of the riser duct 3 is located in the interior 8 of the kiln, and in this case the lower end of the riser duct forms also a kiln exit gas duct. Flue gases from the lime kiln flow upwards via this duct into the separator cyclone 4. Lime mud is thickened in a lime mud filter 16 which is standing on the same floor level as the feed end 7 of the kiln 2. The lime mud is thickened typically to a dry solids content of over 75%, but the dry solids content can also be less than 75%. There is a conveyor belt 17 which drops the moist lime mud coming from the filter via pipe 10 to a feed screw 1, or a bull chain conveyor or a corresponding transporter. The feed screw doses the lime mud directly into the interior 8 of the kiln into the lower part 9 of the riser duct, wherein the lime mud is either totally or partly entrained in the flue gas flow and transported with the flue gas into the separator 4 and simultaneously it dries under the effect of the flue gas heat. The dried lime mud is separated from the flue gas, discharged from the separator 4 and taken via a pipe 5 connected to the dryer's bottom end into the interior of the lime kiln to be calcined. The pipe 5 serves as a feeder and conveyor of the lime mud. In screw 1 dried lime mud may also be mixed into moist lime mud being fed into the kiln and further into the riser duct 3.

According to an alternative embodiment, lime mud can be introduced into the kiln flue gas outside the kiln. In FIG. 1, moist lime mud entering via pipe 10a is directed by a screw 1a into the riser duct 3. The introduction point of lime mud is located in close proximity of the kiln shell 14.

The invention is not limited to the embodiments illustrated in FIG. 1, but in addition to a dryer, also a lime mud preheater may be connected to the lime kiln, whereby in the riser duct connected to the kiln lime mud is treated with hot flue gas, which lime mud has previously been dried by means of flue gas discharged from the preheating. The preheated lime mud is separated from the flue gas in a separator, wherefrom it is taken into the lime kiln for calcination.

Figure 2:
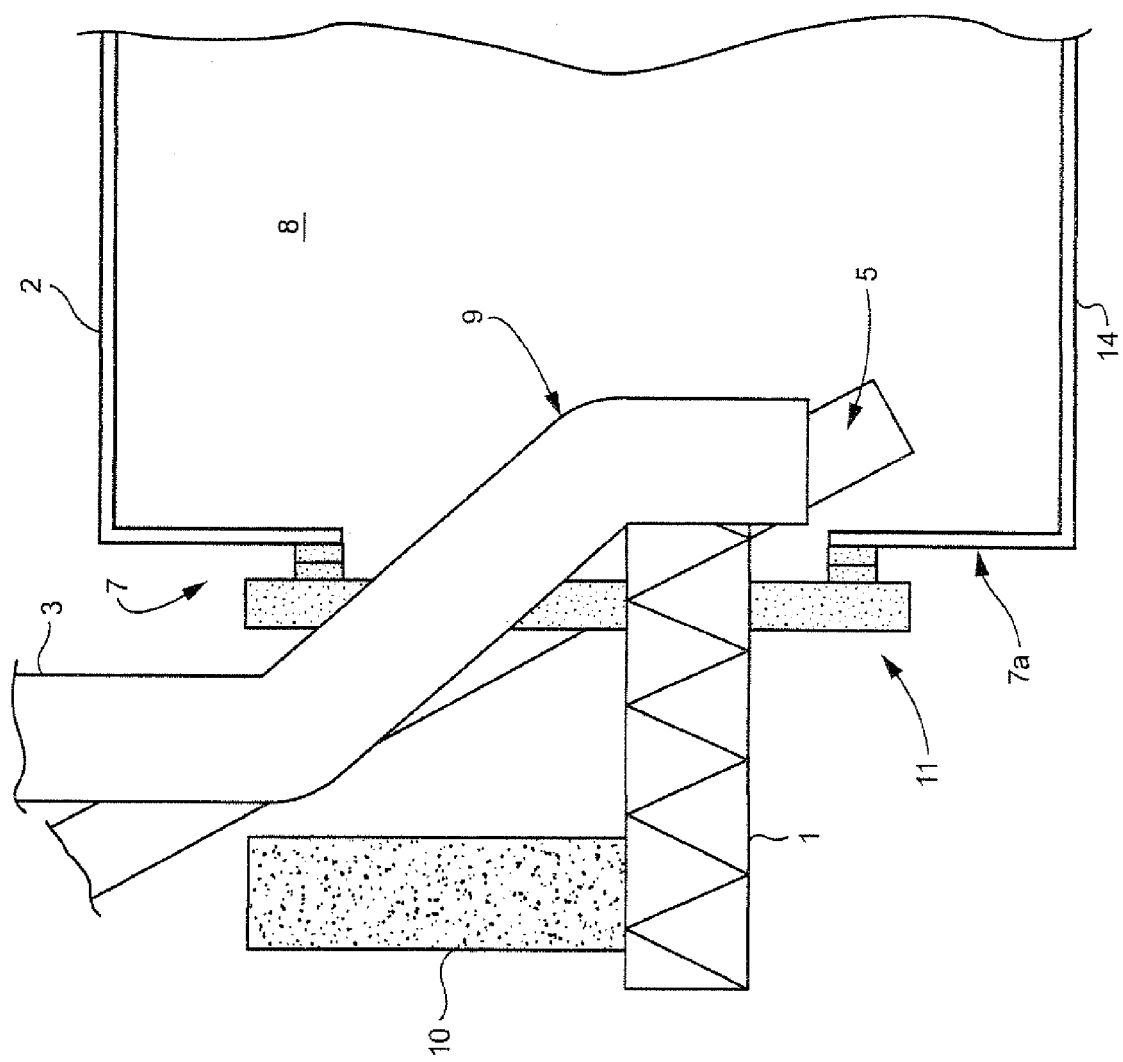
FIG. 2 is a side view, in cross-section, of a lime kiln inlet, according to a first embodiment of apparatus according to the present invention.

FIG. 2 illustrates a feed end construction of a lime kiln according to the invention. In this solution, the lower part of riser duct 3 is located in the interior of the kiln.

Part of the endwall 7 of the kiln shell is formed of an end shield 11, which is stationary, whereas the other part 7a rotates. The lower end 9 of riser duct 3 is located a distance within the kiln shell. The riser duct has a vertical portion, below which there is an elbow and the lower part of the riser duct leading aslope into the kiln shell.

Flue gas generated in calcination is led into riser duct 9, which also receives lime mud from drop tube 10 by means of feed screw 1. The lime mud is suspended in the flue gas in the riser duct and transferred with the flue gas into cyclone 4. The lime mud separated from the flue gas in the cyclone is led via pipe 5 into the kiln for calcination. In this solution, the lime mud is introduced into the flue gas in the riser duct in a point located in the calcination space in the interior 8 of the kiln.

Figure 3:
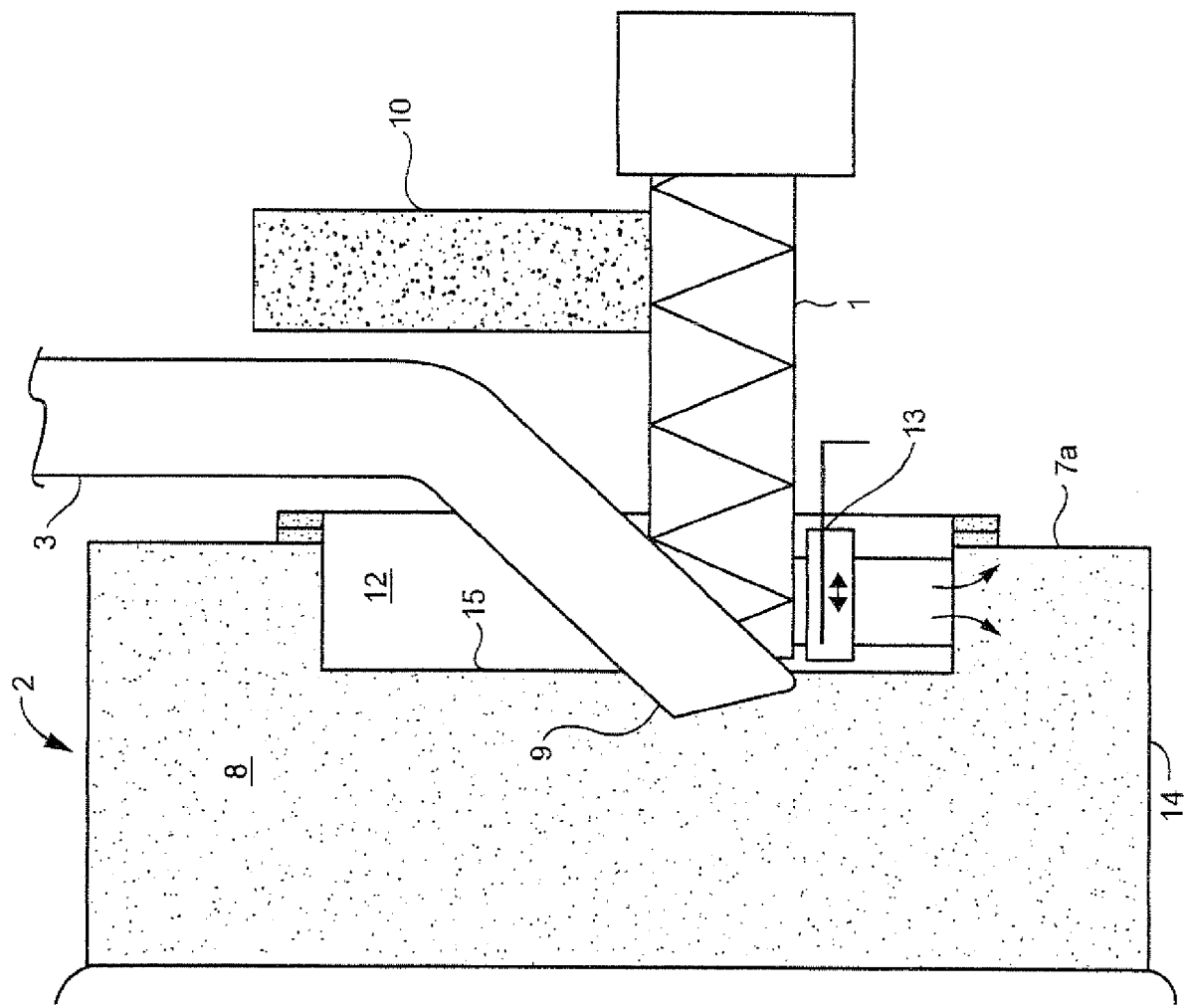
FIG. 3 is a side view, in cross-section, of a lime kiln inlet, according to a second embodiment of apparatus according to the present invention.

FIG. 3 illustrates a more preferable embodiment, wherein the exposure of the riser duct and the lime mud feeding device to hot flue gases has been decreased. The feed end of the kiln shell is provided with a section 12 isolated from the calcination space of the kiln by means of a heat-resistant dividing wall 15, e.g. brickwork. The lime mud feed screw ends up into this space, wherein it feeds the lime mud into the riser duct 3. The lower end of the riser duct, or to be precise, the kiln exit gas duct extends into the calcination space of the kiln only to such a distance that is adequate to catch flue gas into the duct. This structure can be called an inverted feed housing, because the space which protects lime mud treatment devices from hot flue gases is now located inside the kiln shell.

The kiln exit gas duct is very short, whereas in the known lime kilns smoke chambers and long ducts or conduits are needed for leading flue gas from the kiln shell to the riser duct. In particular smoke chambers, feed end housings and other equipment on which lime mud can build up have been eliminated in the present invention.

In connection with the feed screw, here below it, a regulating device is provided, by means of which part of the lime mud being conveyed by the feed screw 1 can, if needed, be directed directly into the kiln shell. The figure illustrates a slide gate 13, the opening of which may be changed to make a desired portion of the lime mud to fall directly into the kiln. The regulating device can also be a rotary valve or tipping valve or like.

As can be seen the method and apparatus disclosed herein is highly advantageous, substantially allowing an immediate mixing of lime mud and hot flue gas thus resulting in quick gas cooling and preventing plugging. Thus the kiln exit gas temperature can be substantially higher than in conventional kilns, which means that a shorter kiln for the same capacity can be used. This allows the utilization of a feed end structure which is lighter than in conventional kilns, because the lime kiln is devoid of a feed end housing located exteriorly of the kiln shell, all lime mud is fed by means of a single feeding device, such as a screw. If needed, such as in disturbances, lime mud falls directly to the kiln shell. The kiln structure is easier to clean.

What is claimed is:

1. A method for feeding lime mud into a lime kiln including a rotary kiln shell having an interior between a first end wall and a second end wall, the method comprising:
    feeding moist lime mud into the interior of the rotary kiln shell or in close proximity to the rotary kiln shell and entraining the moist lime mud in flue gas flowing from the rotary kiln shell to a separator device;
    pretreating the moist lime mud while the lime mud is entrained with the flue gas;
    separating the pretreated lime mud from the flue gas flow;
    conveying the separated lime mud to the lime kiln, and
    calcining the separated lime mud in the lime kiln.

2. A method according to claim 1 wherein another portion of the lime mud directly enters the interior of the lime kiln shell without passing through the flue gas entering a riser duct for the flue gas, wherein the riser duct has an inlet opening in the interior of the rotary kiln shell.

3. A method according to claim 2 wherein the another portion of the lime mud falls into the interior of the kiln shell.

4. A method according to claim 1 wherein the at least a portion of the lime mud fed through the flue gas flow includes moist lime mud from a lime mud filter.

5. A method according to claim 1 wherein the pretreatment of the lime mud comprises:
    a first stage in which moist lime mud is thickened in a lime mud filter and the thickened moist lime mud is dried by the flue gas from the kiln and separated from the flue gas, and
    a second stage in which the dried lime mud from the first stage is preheated by the flue gas from the kiln during the pretreatment step and thereafter separated from the flue gas, whereby in the second stage dried lime mud is introduced into the flue gas flow in the interior of the rotary kiln shell or in close proximity to the shell.

6. A method according to claim 5, wherein in the second stage moist lime mud is introduced into the flue gas flow.

7. A method according to claim 1, wherein the temperature of the flue gas in the kiln shell exceeds 700 degrees Celsius.

8. A method for feeding lime mud into a lime kiln including a rotary kiln shell having an interior between a first end wall and a second end wall, a riser duct having an inlet section within the rotary kiln shell and an outlet at a separator device, the method comprising:
    feeding moist lime mud into the rotary kiln shell or directly into the inlet section such that the lime mud is entrained by and flows with the flue gas flowing through the inlet section of the riser duct;
    cooling the flue gas in the kiln or in the inlet section using the moist lime mud such that the flue gas temperature falls from above 700 degrees Celsius to below 700 degrees Celsius before flowing beyond the inlet section;
    drying the lime mud entrained by the flue gas with the flue gas in the riser duct;
    separating the dried lime mud from the flue gas in the separator device;
    conveying the separated dried lime mud to the lime kiln, and
    calcining the separated lime mud in the lime kiln.

* * * * *